(12) United States Patent
White et al.

(10) Patent No.: US 6,463,349 B2
(45) Date of Patent: *Oct. 8, 2002

(54) ULTRASONIC OBJECT CONSOLIDATION SYSTEM AND METHOD

(75) Inventors: Dawn White; David E.E. Carmein, both of Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/859,691

(22) Filed: May 17, 2001

(65) Prior Publication Data

US 2002/0019683 A1 Feb. 14, 2002

Related U.S. Application Data

(63) Continuation of application No. PCT/US00/25211, filed on Sep. 15, 2000, and a continuation-in-part of application No. 09/532,432, filed on Mar. 23, 2000.
(60) Provisional application No. 60/205,127, filed on May 18, 2000.

(51) Int. Cl.⁷ .............................................. G06F 19/00
(52) U.S. Cl. ......................... 700/119; 700/182; 156/73.1
(58) Field of Search .................... 700/117–123, 182; 156/73.1–73.6

(56) References Cited

U.S. PATENT DOCUMENTS

| | | | |
|---|---|---|---|
| 3,574,040 A | 4/1971 | Chitwood et al. | 156/522 |
| 3,932,923 A | 1/1976 | DiMatteo | 29/407 |
| 3,970,831 A | 7/1976 | Hegyi | 235/151.1 |
| 4,133,711 A | 1/1979 | August et al. | 156/353 |
| 4,351,688 A | 9/1982 | Weiss et al. | 156/358 |
| 4,382,836 A | 5/1983 | Frank | 156/459 |
| 4,419,170 A | 12/1983 | Blad | 156/361 |
| 4,589,062 A | 5/1986 | Kishi et al. | 364/168 |
| 4,743,733 A * | 5/1988 | Mehta et al. | 219/121.65 |
| 5,015,312 A | 5/1991 | Kinzie | 156/63 |
| 5,398,193 A | 3/1995 | deAngelis | 700/119 |
| 5,590,454 A | 1/1997 | Richardson | 29/527.4 |
| 5,594,652 A * | 1/1997 | Penn et al. | 700/119 |
| 5,779,833 A | 7/1998 | Cawley et al. | 156/89.11 |
| 5,818,005 A | 10/1998 | Pratt et al. | 219/69.15 |
| 5,847,958 A | 12/1998 | Shaikh et al. | 364/468.26 |
| 5,897,825 A * | 4/1999 | Fruth et al. | 264/401 |
| 5,933,701 A | 8/1999 | Stucker et al. | 419/12 |
| 5,997,681 A | 12/1999 | Kinzie | 156/263 |
| 6,021,358 A | 2/2000 | Sachs | 700/98 |
| 6,129,872 A * | 10/2000 | Jang | 264/75 |
| 6,129,884 A * | 10/2000 | Beers et al. | 264/401 |
| 6,136,132 A | 10/2000 | Kinzie | 156/258 |
| 6,136,252 A * | 10/2000 | Bedal et al. | 264/308 |
| 6,176,953 B1 * | 1/2001 | Landreth et al. | 156/73.3 |

* cited by examiner

Primary Examiner—Leo Picard
Assistant Examiner—Zoila Cabrera
(74) Attorney, Agent, or Firm—Gifford, Krass, Groh, Sprinkle, Anderson & Citkowski, PC

(57) ABSTRACT

Machine tools combine material addition via ultrasonic object consolidation and subtractive techniques for imparting high-dimensional accuracy to a finished object. A material supply and feeder, ultrasonic horn, and feedstock cutting device are integrated with a material removal subsystem preferably including a cutting tool and an excess material removal system. Any metal, plastic or composite material suitable for ultrasonic joining may be employed as a feedstock, and these material may assume the form of tapes, sheets, wires, filaments, dots or droplets, with the feeding and material cutting components being designed for the specific feedstock employed. The cutting tool for excess material removal, may be a knife, drill/mill, grinding tool, or other tool capable of accurately cutting the external contour of a cross section of the part being built, and for removing excess feedstock remaining following the application process. The material removal could consist of a vacuum or blower system, chip auger, or other suitable apparatus. A machine disclosed as part of the preferred embodiment is able to deposit material in one step, and optionally and selectively remove it in another. Through the expeditious combination of deposition and removal, the fabrication of objects of arbitrary shape may be realized.

26 Claims, 6 Drawing Sheets

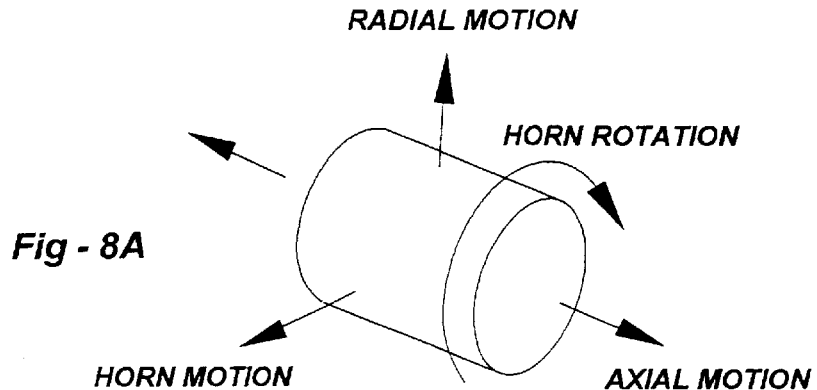
*Fig - 8A*
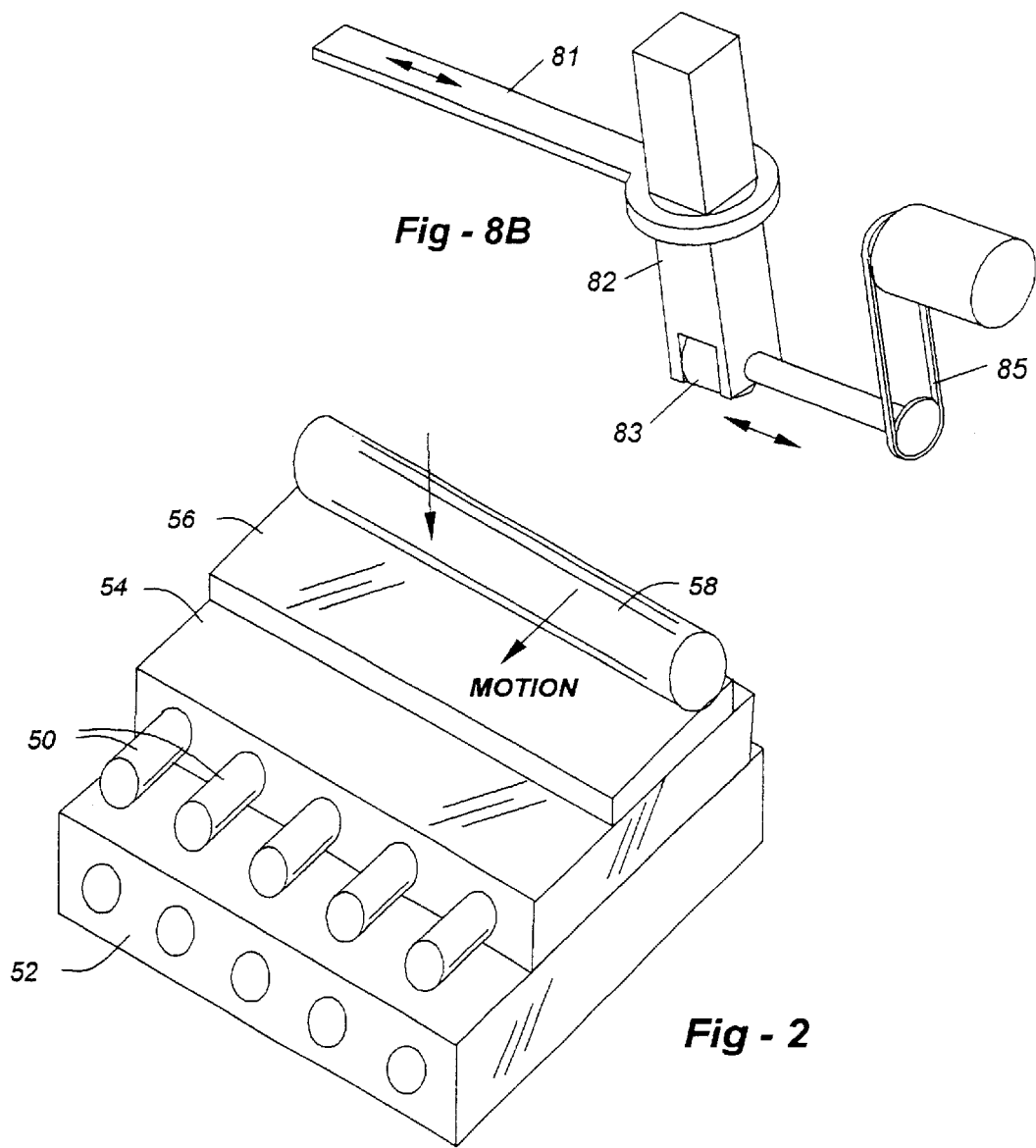
*Fig - 8B*
*Fig - 2*

ULTRASONIC OBJECT CONSOLIDATION SYSTEM AND METHOD

REFERENCE TO RELATED APPLICATIONS

This application claims priority of U.S. Provisional Patent Application Serial No. 60/205,127, filed May 18, 2000; and is a continuation PCT/US00/25211, filed Sept. 15, 2000; and is a continuation-in-part of U.S. patent application Ser. No. 09/532,432, filed Mar. 23, 2000, the entire contents of each application being incorporated herein by reference.

FIELD OF THE INVENTION

The present invention relates generally to fabrication of objects and prototypes through the sequential deposition of material. More particularly, the invention relates to ultrasonic consolidation.

BACKGROUND OF THE INVENTION

Conventional machine tool such as lathes, mills, EDM machines etc. use various methods to remove material from a block or billet to produce an object of a desired shape. This process is highly efficient and accurate in many applications, but has shortcomings when certain types of features, such as deep narrow slots, or complex internal features are required. In these situations multiple machine set ups may be required, or conventional machining may be combined with EDM to produce the desired features. In some cases, it may be necessary to produce a casting in order to obtain the desired geometry. The ability to add and remove material on the same machine can address many of these issues, and allow objects to be produced more quickly and efficiently than current methods.

Many technologies are now being marketed to perform additive manufacturing. Generally known as rapid prototyping technologies these include stereolithography, fused deposition modeling, selective laser sintering, laser powder deposition and others. Most of these processes have only been robustly commercialized for use with polymer, wax or paper feedstocks. As a result, they cannot be used commercially, alone or with subtractive processing, to produce objects from engineering metals.

Some researchers have developed techniques to apply metals via welding methods, and to machine away excess material (Prinz, U.S. Pat. Nos. 5,301,415; 5,281,789; and 5,207,371) either using or without a support material (Kovacevic). These systems involve using arc welding, or laser metal deposition (with either powder of wire feedstocks) to deposit molten metal droplets. Another approach is droplet generation by various metal melting and droplet formation techniques (as described by Starrett, Prinz, Chen, Tseng, Visnawathan and others). Incorporating molten metal droplet deposition in such a system presents certain problems, including the presence of high voltage, smoke and fume, eye safety issues, the retention of molten metal etc. associated with welding and foundry operations. These issues have inhibited adoption of welding, laser deposition and other molten metal techniques as a means of adding material to an object prior to or during machining.

As described in U.S. patent application Ser. No. 09/532,432, ultrasonic object consolidation is a technique for performing additive manufacturing which avoids most of the problems associated with other metal deposition methods. The solid state, low energy nature of this process eliminates hazards such as molten metal, high intensity arcs, high power, dust and smoke, etc.

SUMMARY OF THE INVENTION

This invention is directed to a practical machine tool for combining material addition via ultrasonic object consolidation, including subtractive techniques for imparting high-dimensional accuracy to a finished object. Broadly, a system according to the invention includes a material supply and feeder, ultrasonic horn, and feedstock cutting device. These components are integrated with a material removal subsystem preferably including a cutting tool and an excess material removal system.

Any metal, plastic or composite material suitable for ultrasonic joining may be employed as a feedstock, and these materials may assume the form of tapes, sheets, wires, filaments, dots or droplets, with the feeding and material cutting components being designed for the specific feedstock employed. The cutting tool for excess material removal may be a knife, drill/mill, grinding tool, laser or other tool capable of accurately cutting the external contour of a cross section of the part being built, and of removing excess feedstock remaining following the application process. The material removal could consist of a vacuum or blower system, chip auger, or other suitable apparatus.

A machine disclosed as part of the preferred embodiment is able to deposit material in one step, and optionally and selectively remove it in another. Through the expeditious combination of deposition and removal, the fabrication of objects of arbitrary shape may be realized. This embodiment of the invention feeds raw material in the form of metal tape to the deposition head, where it is bonded layer by layer in an upward fashion.

In terms of apparatus, a preferred embodiment includes a deposition head for adding raw material mounted adjacent to a device which removes material, both of which move in X-Y-Z motion with respect to a material deposition plane. Both the deposition head and removal device are connected to a Z-carriage which provides a full range of orthogonal motion for both devices using a single motion structure. Motion in the +/−X and +/−Y directions is effected by separate gantry/carriage mechanisms. A movable track carries electrical power and signal lines to and from the moving units. A tool holder permits on-the-fly switching of tool profiles.

In a different embodiment, the material feeder, removal unit, or both may advantageously be mounted on separate multi-axis robots. The robot design may be conventional rotary axis industrial robots, Cartesian robots, or other designs suitable for effecting flexible, programmable motion. Advantages of robotic mounting include the ability to include one or more robots in a single work cell, to separate various functions such as material feeding, material consolidation, and material trimming so as to increase throughput, and to enable incorporation of material feeding, consolidation and trimming into other manufacturing operations. A robotic arm may also be mounted on a gantry type carriage of the type described previously providing the advantages of robotic flexibility over the large travel areas provided by gantry type systems.

Alternatively, the feeder may be mounted relative to a multi-axis mill or other machining center functioning as the removal unit. The object being fabricated may also be fixtured enabling fabrication from the center outward to realize particular advantages such as the minimization of residual stress accumulation. To minimize "stairstepping" the material removal unit may be operative to perform two trimming operations, including a high-speed trimming operation and a contouring trim to provide material increments in two or more directions. The material feeder may include multiple sources to deposit increments in multiple directions, or to fabricate the using dissimilar materials and/or varying thicknesses.

BRIEF DESCRIPTION OF THE DRAWINGS

FIG. 2 is a drawing which shows an ultrasonic consolidation for fabrication of metal matrix composites;

FIG. 8A is a drawing which shows a rotating horn design applicable to the invention; and FIG. 8B is depicts an alternative embodiment of an ultrasonic horn assembly based on a reed-wedge design.

DETAILED DESCRIPTION OF THE INVENTION

Figure 1:
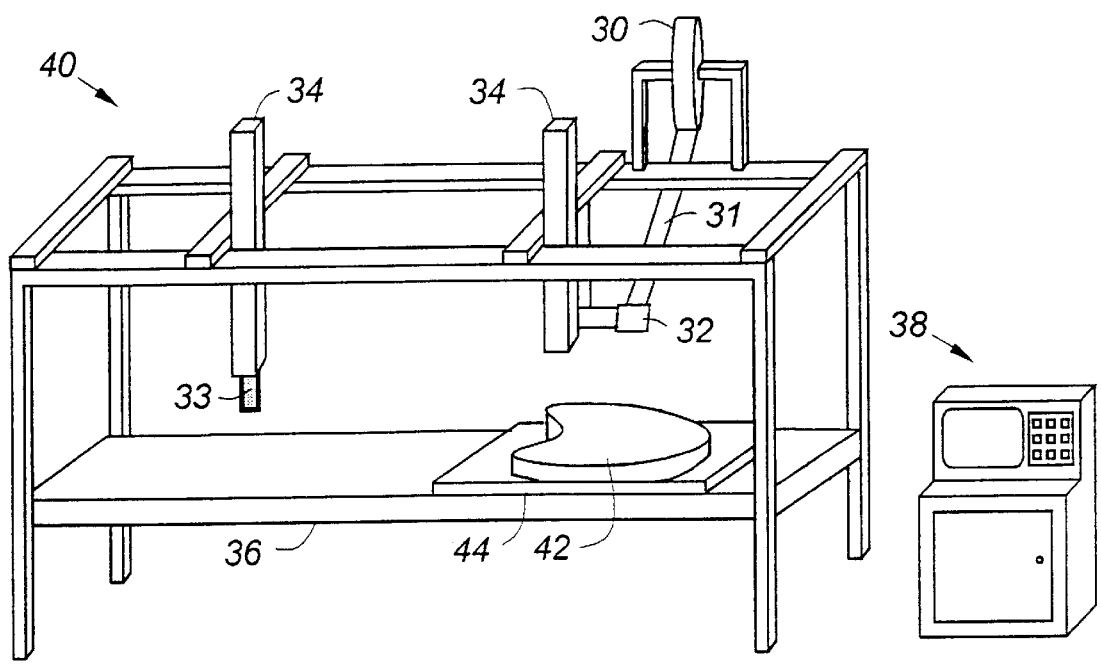
FIG. 1 is a simplified illustration of a machine according to the invention.

A simplified illustration of a machine according to the invention is illustrated in FIG. 1. The system incorporates the elements of an ultrasonically powered material addition subsystem employing a feedstock 30 of tape 31 to a horn 32, with a milling tool 33 for trimming and removing excess material. Although illustrated with a tape feedstock 30, and a milling type material removal tool 33 supported on masts 34, alternative material delivery and removal subsystems may be used in accordance with the description herein.

A table 36 capable of providing the workpiece with XYZ motion is integrated within a rigid frame 40. The build object 42 rests on a base plate 44. A controller 38 receives CAD descriptions of objects to be produced and slices the files to produce cross sections of the object used to generate path instructions for both material addition and removal. Not illustrated in this figure is a system for purging removed excess material from the work area; however, a blower or vacuum system may be employed for such purpose.

The system may also be modified to include a supply of reinforcing fibers, enabling the apparatus to fabricate continuously reinforced metal matrix composite components, including the type shown in FIG. 2. Reinforcement fibers 50 are delivered to previously deposited layer(s) 52. Using an aluminum-based composite as an example, an aluminum powder 54 may be used, over which aluminum foil 56 is laid down. An ultrasonic welding horn 58 applies a compressive load 60 through the horn in the direction of travel shown, thereby consolidating the structure. It will be appreciated by those of skill in the art that different material combinations may be used according to the invention to produce alternative laminate, reinforced, ceramic and metal matrix composite (MMC) structures.

High cost manufacturing techniques which are not robust are a major reason for low use of continuously fiber reinforced metal matrix composites in aerospace, automotive and sporting goods applications. Although many techniques exist for particulate and discontinuously reinforced MMCs, producing a continuously MMC generally involves production of thin tapes which must then be assembled into a desired shape and HIP'ed to full density. Numerous difficulties are encountered at each stage of the process resulting in high costs and low yields.

Figure 3:
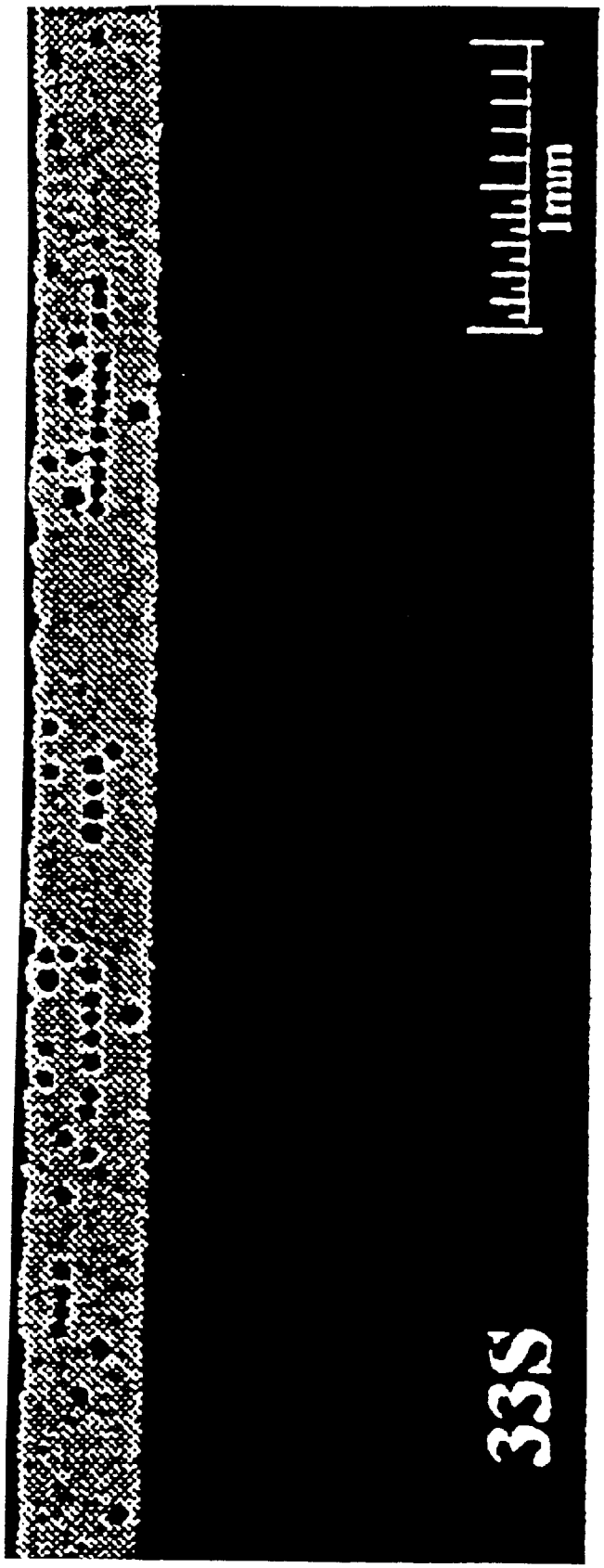
FIG. 3 is a drawing which shows an ultrasonically consolidated metal matrix composite specimen.

Through appropriate selection of processing parameters such as horn pressure, vibration amplitude, horn speed and fiber volume, the foil layers can be consolidated around the fiber layers, providing a low cost, high productivity means of producing layers of metal matrix composites. FIG. 3 is a micrograph of such a multilayer specimen. Since the specimen was produced by applying fibers manually, rather than automatically as described herein, the fiber placement is irregular, and the fiber volume is low. Automation is used to address these issues.

When combined with the object formation methods described above for the ultrasonic object consolidation system, complex objects can be produced. Furthermore, MMC sections can be added to sheets or other components, to act as stiffeners or to supply locally higher mechanical properties.

Figure 4:
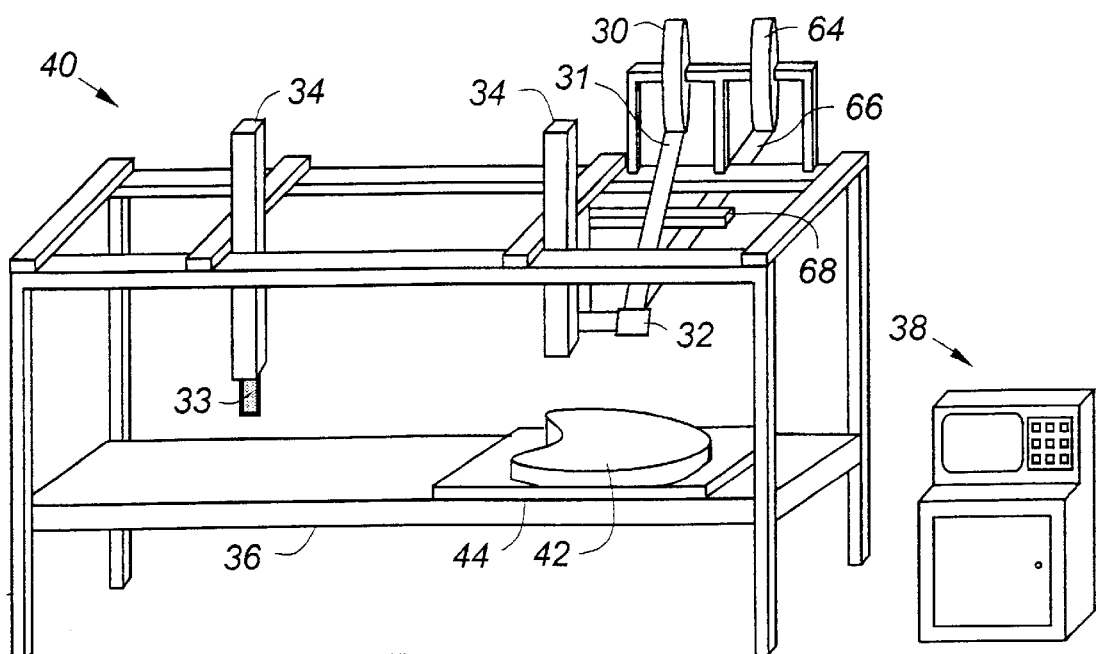
FIG. 4 is a drawing which shows a System incorporating a system for optionally adding fibers to an object being additively manufactured using ultrasonic object consolidation (UOC)

By adding a layer of reinforcing fibers between the layers of feedstock of the machine illustrated in FIG. 1 (where tape is preferably the feedstock employed) an economical, high productivity technique for fabricating continuously reinforced metal matrix components results. The general concept, depicted schematically in FIG. 4, integrates a fiber handling system for adding metal matrix composite fabrication capability to an ultrasonic consolidation system. The added subsystem includes a fiber supply 64 feeding fibers from individual creels or as a tow 66 to tape and fiber handling rolls 68. The fiber handling and placement subsystem can be viewed as an optional feature on an ultrasonic object consolidation machine. Addition of this capability allows the same unit to be employed to produce either monolithic or composite objects.

Figure 5:
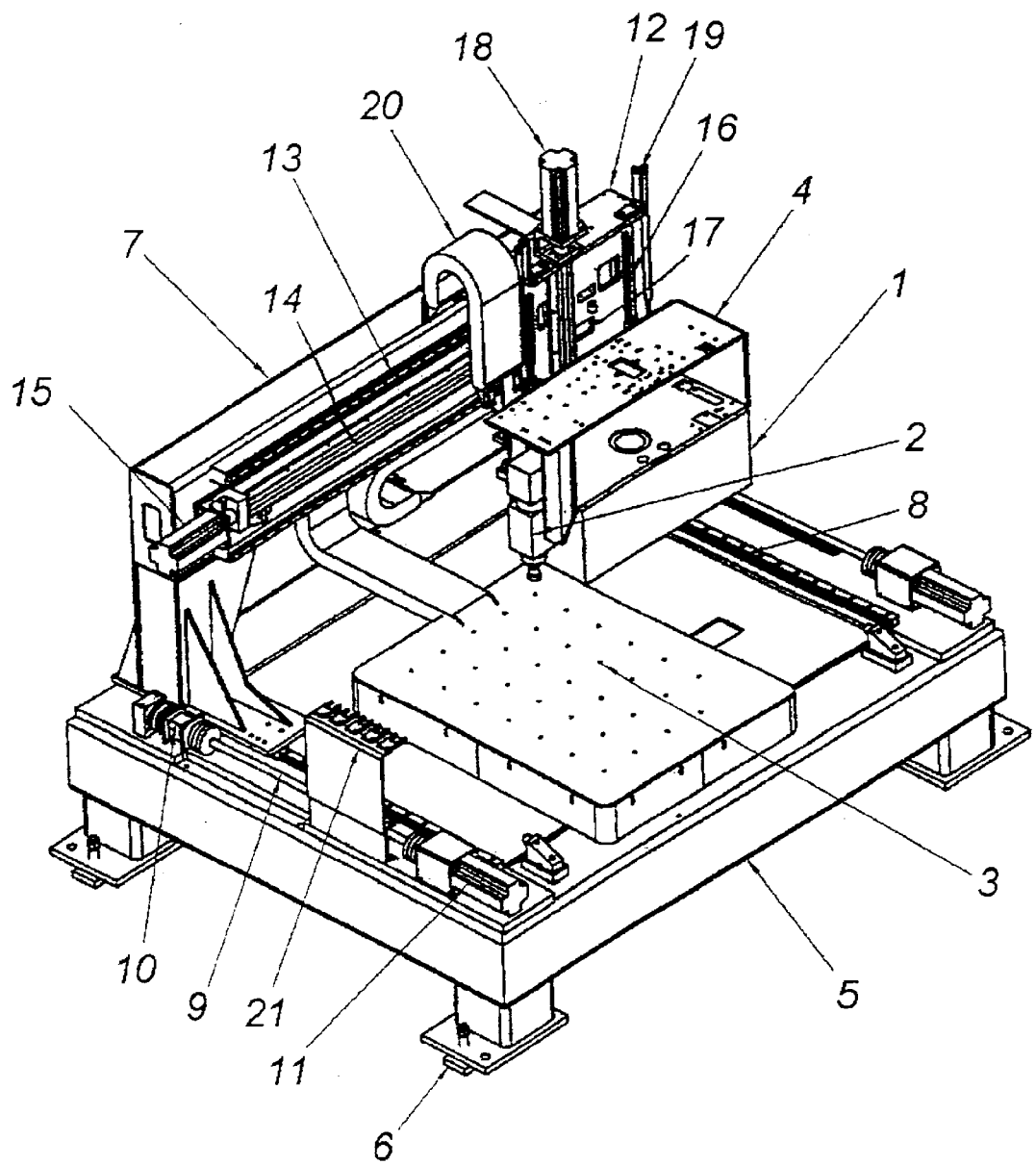
FIG. 5 is a drawing that depicts a preferred embodiment of system in gross scale according to the invention with the protective cover removed.

FIG. 5 is a drawing that depicts a preferred embodiment of the system in gross scale according to the invention with the protective cover removed. A deposition head (1), which adds raw material, is mounted adjacent to a material removal unit, both of which move in X-Y-Z motion with respect to a material deposition plane (3). In this case, the material removal unit is a routing head (2), though, again, alternatives described herein may be substituted as appropriate. Both the deposition head and the routing head are connected to a z-carriage (4), which provides a full range of orthogonal motion for both devices using a single motion structure.

A robust motion base (5) constructed of tubular metal extrusions rests on leveling pads (6). A tubular gantry (7) travels along +/−Y on rails (8). It is actuated by a ball screw (9) and nut (10), driven by a servo-motor (11). Likewise, motion in the +/−X direction is effected by an x-carriage (12) riding on rails (13), actuated by a screw and nut combination (14), and driven by a servo motor (15).

The z-carriage (4) also rides on rails (16). It is also actuated by a screw and nut (17) and driven by a servo-motor (18). In addition, a counter force actuator (19) serves to balance the static loading of the total weight of the z-carriage, thus minimizing energy requirements of the z-motor.

A movable track (20) carries electrical power and signal lines to and from the moving units. A tool holder (21) permits on-the-fly switching of tool profiles. Five tool positions are shown in the tool holder. More or fewer posts may be used according to the ultimate application of the machine.

Figure 6:
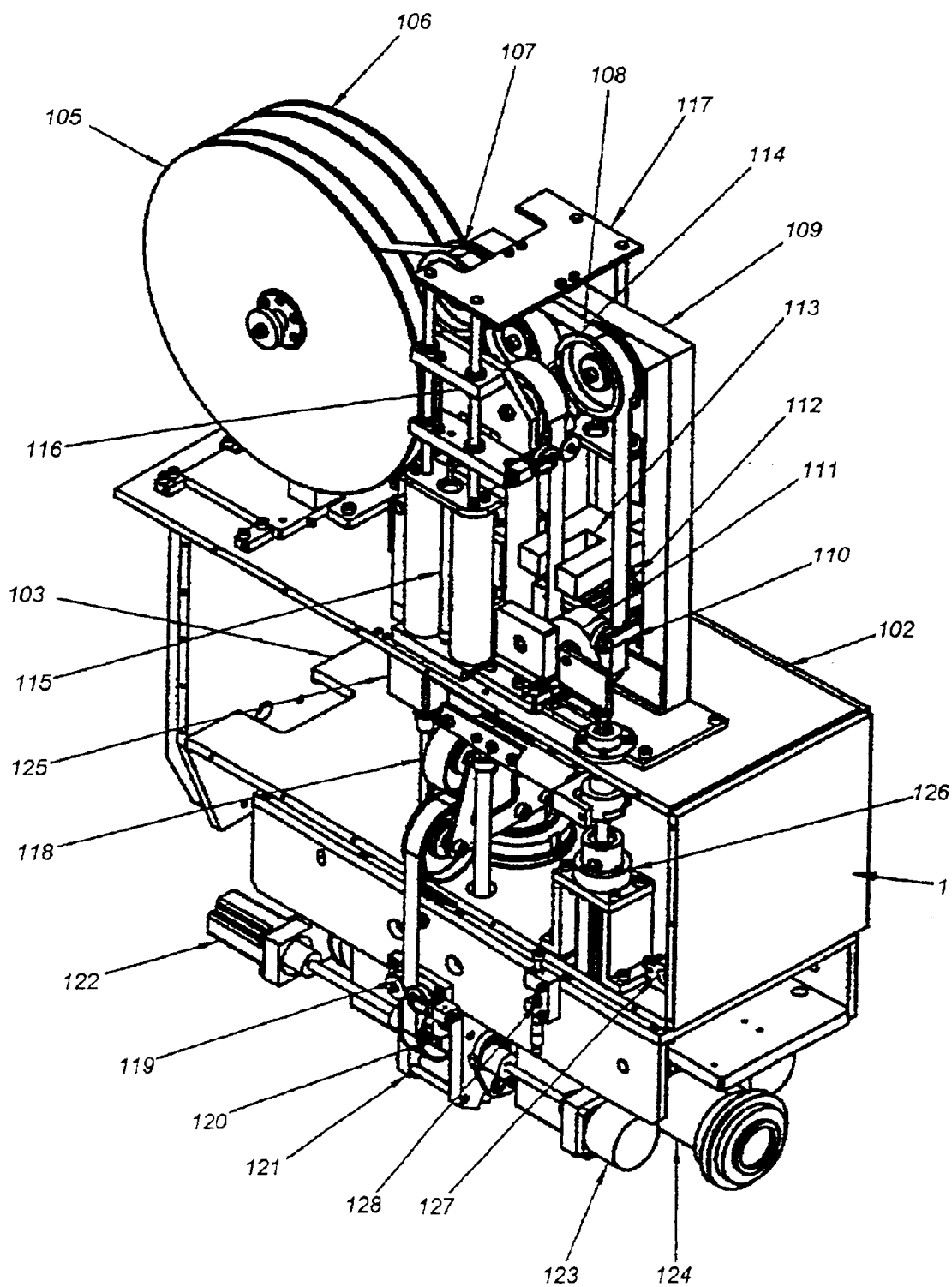
FIG. 6 provides a closer look at the z-carriage and related components.

FIG. 6 provides a closer look at the z-carriage (1) and related components. It is divided into three primary sections: The upper portion (102) is concerned with bulk material feed, the middle section (103) houses force control, z-axis steering, and electrical and pneumatic valves, the lower portion (104) is the deposition head that contains the ultrasonic components, as well as tape feed and cutting elements.

Combined functioning of sections (102–104) enables feeding of metal tape from bulk feed rolls (105,106), with controlled tension, down to the deposition head assembly. Since the rear tape roll and related tape pathways are functionally identical to the front pathway, only one will be reviewed.

Tape begins its route at the bulk feed roll (105) which can be readily accessed from the front. The tape roll swivels to the left to provide access to the rear roll (106). As tape leaves the roll it travels over guide rollers (107, 108) supported by a roller weldment (109). It then travels downward between sideways guides (110) which provide alignment side to side prior to engaging the pinch roller mechanism (111). The pinch roller is driven by a servo motor (112).

As the tape leaves the pinch point, it travels past a tape sensor (113) that senses presence/absence and over a tensioning roller (114). The roller is actuated up and down by a linear actuator (115) traveling on a linear guide assembly (116) whose rails are stabilized at their ends by a stabilizing plate (117). A linear sensor built into the guide assembly (116) outputs the vertical position of the tensioning roller. With the linear actuator providing constant force output, the servo-motor acts in concert with the linear sensor to keep the tensioning roller in the same relative position.

Once the tape leaves the upper section, it is directed outward by guide rollers (118) and through another set of sideways guides (119). It then hits the final guide roller (120) and is directed inward towards the final process area (121). The second bulk tape feed (106) directs tape in a similar fashion to the opposite side of the deposition zone so that the machine can deposit tape in two directions.

The process area includes a tape feed, driven by a feed motor (122), and a tape cutter, driven by a rotary actuator (123). The ultrasonics are driven by a converter (124).

Figure 7:
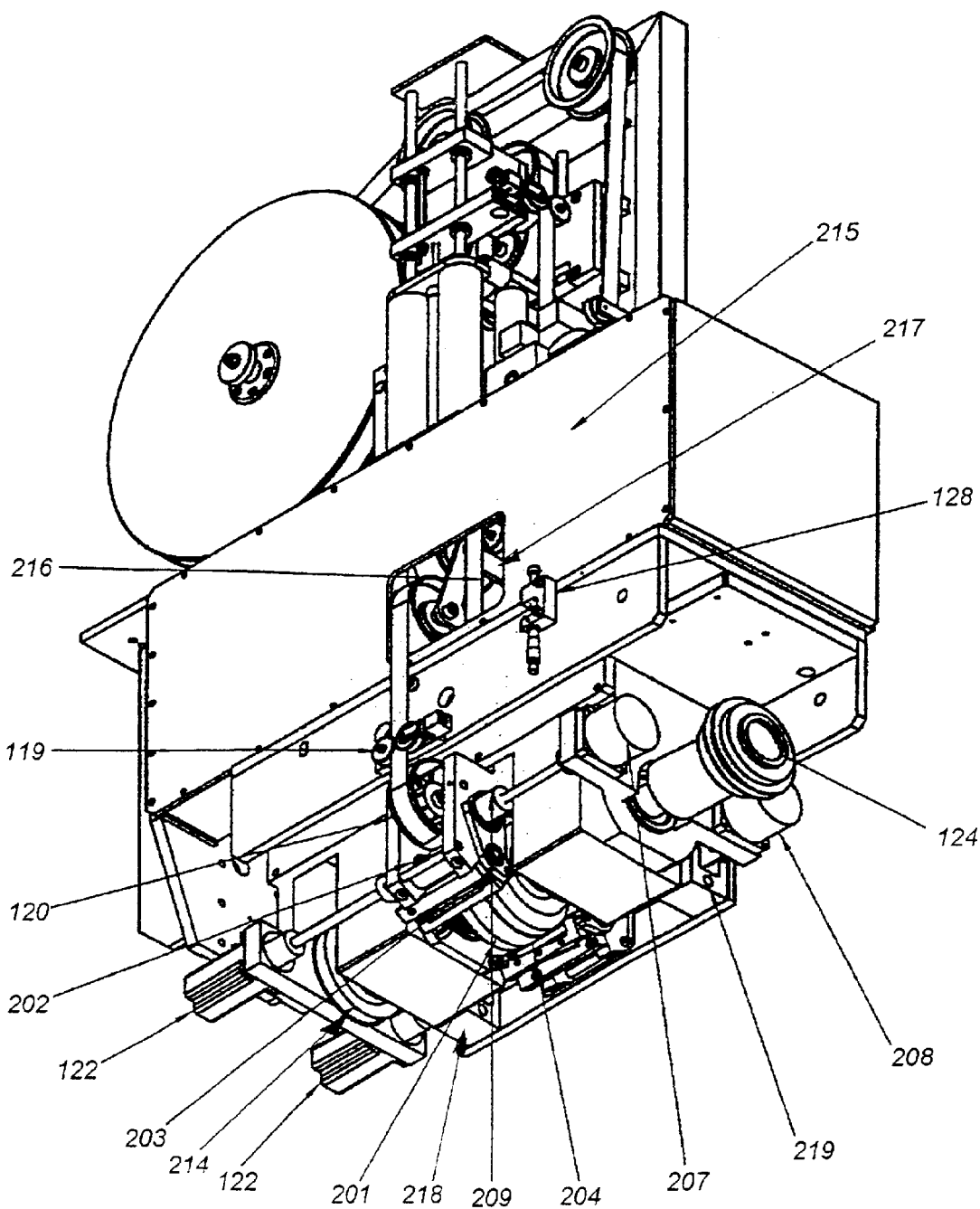
FIG. 7 provides details of the lower portion of the z-carriage.

The entire lower assembly (104) rotates on hinges best seen in FIG. 7, and is ounterbalanced by a tension strut and actuator (125). Likewise, a force actuation system (126) exerts controllable force downward on the lower assembly. A steering actuation means (127) provides rotary motion about the central z axis. Initial leveling of the flat ultrasonic contact line is enabled by rotation of the lower section (104) about a y axis pivot point, and is precisely controlled using a micrometer (128).

FIG. 7 provides details of the lower portion of the z-carriage. It contains the deposition head and related support assemblies. Metal tape supplied by bulk feed is ultrasonically bonded at the contact point of the ultrasonic welding horn (201) by producing an atomically clean faying surface between the material increments without melting the material in bulk. Tape is fed to both sides of the horn. It is fed to the process by pinch rollers (202) and cut to length by cutting blades (203, 204). Servo motors (122) drive the pinch rollers. Rotary actuators (207, 208) actuate the cutters through a cam mechanism (209).

FIG. 7 also shows items previously discussed, such as the lower guide roller (120), the bottom sideways guide (119), the ultrasonic converter (124), and the leveling micrometer (128).

A drive means (204) powered by a servo motor (not shown) actuates the ultrasonic horn (201) about its central axis. In this way the surface speed of the rotating horn is made to match the y axis speed of the moving gantry.

The front cover of the z-carriage is shown here (215), so the force actuation assembly (216) is viewable only through the front access port (217). FIG. 7 provides a clear view of the hinge points (218, 219) for rotation of the lower assembly. The force actuation assembly controls motion about these pivots.

An alternative embodiment of the invention is based on flexible work cell concepts. This arrangement preferably incorporates a tape (or other feedstock) application head mounted on a multi-axis (i.e., 6) robot, with a second robot arm carrying one or more cutting devices such as a spindle, knife, laser, water jet cutter, or other tool, as appropriate. The robotic system would preferably incorporate coordinated notion methods to eliminate collisions, and would be applicable to simultaneous feedstock layup and trimming.

In this configuration, material feeding concepts such as those used in welding workcells or for stamping presses, incorporating decoiling and feeding may serve as an appropriate means of material supply mounting and feeding. Alternatively, a robotic end effector allowing the mounting and alternating use of two workheads may be employed with the tape application and cutting mounted on a single robot.

Yet a further embodiment involves retrofitting an ultrasonic metal tape or feedstock application apparatus to an existing machining center such as a vertical three-or five-axis mill. In this case, a secondary tape feeding and mounting apparatus is required.

Still another arrangement of a system according to the invention involves building up a component through tape or other applied feedstock in the vertical direction. In such an embodiment, the system is preferably fixtured so that the part is built from the center outward, rather than from the bottom up, as is typically the case in additive manufacturing or tape lay-up systems.

This approach could complicate the build system, since there would either be two deposition and material trimming heads for applying and removing material on both sides of the center axis of the part, or a means of rotating the part through 180 degrees in order to present the two sides to a single deposition and trimming device. However, such a configuration would also afford some important advantages. For one, since the major axes of the part are now built in either the Z and X axes, or the Z and Y axes, rather than X and Y, this will result in a taller machine with a smaller footprint. It may also facilitate feedstock locating, feeding and handling.

Another significant benefit would be the uniform distribution of residual stresses in the part being built. Most additive manufacturing processes produce residual stresses as each material layer is applied, typically as a result of transformation and thermal contraction stresses. As layers are added, these layers often produce warping of a part, and, in some cases, cracking. Depending on the process, a heat treatment or other processing may be required to prevent the problem, adding time, cost and complexity to the process.

In contrast, a technique for building objects from the center will result in a balanced residual stress distribution, with less opportunity for gross warping of the parts. Although ultrasonic object consolidation as described in this specification produces significantly lower bulk residual stress than other build techniques involving liquid to solid transformation, this balancing of stresses can still be beneficial.

For any of the machine configuration and material application approaches described above, it is possible to trim the component being fabricated following each material application, i.e., each application of tape or wire, following deposition of each layer, or following the application of several layers. Furthermore, it may be desirable to conduct two trimming operations, where the first is a high-speed trimming operation, and the second is a contouring trim, designed to produce highly accurate and smooth surfaces on curved components, thereby eliminating the so-called stairstepping often found in additively manufactured components.

If the feedstock is applied using an ultrasonically activated roller, it is highly desirable to be able to apply material as the roller moves in either direction, effectively increasing the duty cycle of the system from 50% to 100%. This invention is not limited in this regard, and may use two feedstock sources, each feeding from a different direction which is fed under the roller at the beginning of the run. However, multiple additional rolls or other types of feeders may also be employed, with the objective of minimizing operator intervention, or in the interests of employing multiple materials to produce functionally gradient materials.

For example, if it is desired to produce an object from different materials such as stainless steel and copper, using the copper in location where good thermal conductivity is required, and stainless steel for strength and wear resistance, four material sources could be used, two on each side of the axis of material deposition. Additional material sources may also be used, depending upon the ultimate implementation.

Although numerous researchers in the additive manufacturing field have noted the potential benefits of using layers of varying thickness to increase deposition rate (by using thicker layers) or improve resolution (by decreasing layer thickness), there have been relatively few practical means of implementing this on commercially available machines for techniques which employ lamination. The current system is relatively well suited to this process, however, since multiple tapes or other feedstocks may be provided having varying thickness. The possible thicknesses will depend on a combination of the materials used and the power capacity of the system.

Although feedstocks have been illustrated as being fed primarily from above, horizontal mounting, or floor mounting is possible, and may be desirable in certain applications. In addition, palletizing the feedstock, or feeding from a coil shipped in barrels may be convenient. Pallet decoiling apparatus may be used in conjunction with material supplied in such a form.

Horn Design Considerations

Various types of horn designs and ultrasonic power trains will be apparent to those of skill in the art, and this invention is not limited in this respect. If an ultrasonically activated roller is employed to bond the metal layers together, such a roller should provide an axial motion of 5 to 60 microns at 10 to 60 kHz with minimal radial motion. The preferred embodiment is configured with a horn that is excited directly; however, alternate approaches including wedge-reed type designs, or systems where a roller is indirectly excited through a bearing system and a clevis arrangement may be desirable.

It may additionally be possible to configure a system wherein the sonotrode is non-rotating, but can traverse the feedstock in such a way as to produce bonding at the faying surfaces of the component. The use of a rotating sonotrode is convenient rather than necessary according to this invention.

FIG. 8A is a drawing which shows a rotating horn design applicable to the invention. FIG. 8B depicts an alternative embodiment of the ultrasonic horn assembly based on a reed-wedge design. The design also incorporates an ultrasonic welding horn suitable for the object consolidation process. In FIG. 8B, a wedge (81) us ultrasonically driven in the direction shown. It is attached to a reed (82) that conveys the motion down to the ultrasonic welding horn (83). A motor (84) drives the major axis of the horn through a suitable means (85). Not shown is a mechanism for feeding tape to the active contact zone of the horn. A mechanism such as that depicted in FIGS. 5–7 would be suitable, however.

Software Considerations

The current art in this field is generally based on the use of the .STL file type data format to generate machine instructions. In addition, laminated-type systems have used full width sheets, which produces difficulty in creating a uniform tension, but allows ease of programming. A further unique aspect of this invention includes the capability of determining how to apply tapes (or other feedstocks) so as to minimize the number of very narrow pieces of material which must be applied, a means of ensuring that the Z axis joints are staggered while accomplishing the foregoing, and means of distinguishing between internal and external boundaries when determining where to start and stop tape deposition.

We claim:

1. A system for fabricating an object through ultrasonic consolidation, comprising:
    a memory for storing a description of the object to be fabricated;
    a material feeder for providing material increments;
    a source of ultrasonic energy operative to consolidate the material by producing an atomically clean faying surface between the increments without melting the material in bulk;
    a material removal unit for removing excess material not required to form the object; and
    a controller operative to coordinate the successive consolidation of the material increments supplied through the material feeder and remove the excess material using the material-removing unit to produce the object in accordance with the stored description.

2. The system of claim 1, wherein the material removal unit includes a spindle, knife, laser, water jet, cutter, drill, milling machine or ultrasonic machining tool.

3. The system of claim 1, wherein the feeder is operative to provide material in the form of sheets, tapes, filaments, dots or droplets.

4. The system of claim 1, further including an actuation system for imparting relative motion between the source of ultrasonic energy and the object being fabricated.

5. The system of claim 4, wherein the object being fabricated is supported on a stage, and the actuation system is operative to move the stage in multiple dimensions.

6. The system of claim 4, wherein the actuation system includes a deposition head moveable in multiple dimensions relative to the object being fabricated.

7. The system of claim 6, wherein the deposition head includes the material removal unit, and both in unison relative to the object being fabricated.

8. The system of claim 7, wherein the deposition head forms part of a carriage moveable along the x, y and z axes.

9. The system of claim 8, further including a counterforce actuator operative to balance static loading due to the weight of the carriage.

10. The system of claim 1, wherein the material feeder is mounted on a multiaxis robot.

11. The system of claim 1, wherein the material removal unit is mounted on a multi-axis robot.

12. The system of claim 1, wherein the material feeder and removal unit are mounted on separate multi-axis robots.

13. The system of claim 12, further including a coordinated motion capability to eliminate collisions between the robots.

14. The system of claim 12, further including a coordinated motion capability facilitating simultaneous material feed and excess removal.

15. The system of claim 1, wherein the material feeder is mounted relative to a material removal unit in the form of a multi-axis mill or other machining center.

16. The system of claim 1, wherein the object is fixtured enabling the object to be fabricated from the center outward.

17. The system of claim 16, further including at least two material feed and removal units on either side of the center axis of the object being fabricated.

18. The system of claim 16, further including a drive for rotating the. object through 180 degrees in order to present opposite sides of the object to a single material feed and removal unit.

19. The system of claim 1, wherein the source of ultrasonic energy is operative to apply the energy along multiple dimensions.

20. The system of claim 1, wherein the material removal unit is operative to perform two trimming operations, including a high-speed trimming operation and a contouring trim to minimize stairstepping.

21. The system of claim 1, wherein the material feeder is operative to provide material increments in two or more directions.

22. The system of claim 21, wherein the material feeder includes multiple sources of material increments, one applicable to each direction.

23. The system of claim 1, further including multiple material feeders, enabling the object to be fabricated using dissimilar materials.

24. The system of claim 1, further including multiple material feeders, enabling the object to be fabricated with material increments of varying thickness.

25. The system of claim 1, further including a tool holder facilitating rapid switching of tool profiles.

26. The system of claim 1, further including:
 a fiber material feeder; and
 a handling unit for feeding the raw material and fiber material on a selective basis to produce a fiber-reinforced object.

* * * * *